United States Patent
Yen et al.

(10) Patent No.: US 8,659,547 B2
(45) Date of Patent: Feb. 25, 2014

(54) TRAJECTORY-BASED CONTROL METHOD AND APPARATUS THEREOF

(75) Inventors: Chen Lan Yen, Tainan (TW); Wen Hung Ting, Guiren Township, Tainan County (TW); Chia Chang Li, Pingtung (TW); Duan Li Liao, Taichung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1032 days.

(21) Appl. No.: 12/582,282

(22) Filed: Oct. 20, 2009

(65) Prior Publication Data

US 2011/0018797 A1 Jan. 27, 2011

(30) Foreign Application Priority Data

Jul. 23, 2009 (TW) ................................ 98124819 A

(51) Int. Cl.
 *G06F 3/033* (2013.01)
(52) U.S. Cl.
 USPC ......................................................... 345/157
(58) Field of Classification Search
 USPC .......... 345/156–184; 382/103, 151, 181–199, 382/276–293; 715/700, 863
 See application file for complete search history.

(56) References Cited

U.S. PATENT DOCUMENTS

| | | | |
|---|---|---|---|
| 5,454,043 A | 9/1995 | Freeman | |
| 7,227,526 B2 | 6/2007 | Hildreth et al. | |
| 7,308,112 B2 * | 12/2007 | Fujimura et al. | 382/103 |
| 7,599,561 B2 * | 10/2009 | Wilson et al. | 382/199 |
| 7,970,211 B2 * | 6/2011 | Wilson et al. | 382/190 |
| 2004/0017938 A1 * | 1/2004 | Cooper et al. | 382/171 |
| 2008/0089587 A1 | 4/2008 | Kim et al. | |
| 2011/0102570 A1 * | 5/2011 | Wilf et al. | 348/77 |

FOREIGN PATENT DOCUMENTS

TW 147011 12/1990

OTHER PUBLICATIONS

Office Action issued by Taiwan Intellectual Property Office on Nov. 19, 2012.

* cited by examiner

*Primary Examiner* — Rodney Amadiz
(74) *Attorney, Agent, or Firm* — Egbert Law Offices, PLLC

(57) ABSTRACT

A method for constructing a gesture mouse utilizes an object e.g., a user's palm) in the background of the photographed region of a video camera as a determination basis. In a computer system, (1) for the image of an object, the point with maximum Y-axis value is set to be a cursor; (2) the point with maximum X-axis value is set to be a push button; (3) the cursor and the push button are used as centers to set small tracking areas respectively; (4) if the distance between the cursor and the push button becomes greater than a designated threshold within a time period, an action of the push button is determined to occur. Images obtained by the video camera are input into a computer through the digital image interface of the video camera or an analog/digital converting card for further processing.

17 Claims, 3 Drawing Sheets

TRAJECTORY-BASED CONTROL METHOD AND APPARATUS THEREOF

CROSS REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to a method and apparatus for a trajectory-based control.

2. Description of Related Art Including Information Disclosed Under 37 CFR 1.97 and 37 CFR 1.98

In the human-computer interface design field, using natural body language as input has been a primary goal of technology development. Use of hand motion as input is an area of particular research focus for major companies in related fields. In recent years, vigorous development of touch panels and multiple-point touch inputs in markets attract much attention. Mobile phones, panels, and notebook computers that use touch input are gaining in popularity. However, areas of the touch inputs are limited to the size of touch panels. Therefore, human-computer interfaces for inputting in terms of video interface are gradually becoming another focus of technology development.

TW Patent No. 147011 discloses a method for constructing a gesture mouse. This method utilizes an object (e.g., a user's palm) in the background of the photographic region of a video camera as a determination basis. In a computer system, for the image of an object, the point with maximum Y-axis value is set to be a cursor while the point with maximum X-axis value is set to be a push button. The cursor and the push button are used as centers to set small tracking areas respectively. If the relative distance between the cursor and the push button is greater than a designated threshold within a time period, an action of the push button is determined. In addition, U.S. Pat. No. 5,454,043 discloses a hand gesture recognition system. Hand gestures are trained and stored for the system to perform further identification processes. U.S. Pat. No. 7,227,526 discloses a video-based image control system. At least two cameras are used to analyze three-dimensional movement of an object. However, this method is not practical.

In current commercial video interactive systems, hand motions merely represent a function. At present, there is no effective method for simultaneously moving a cursor and operating a system function. Therefore, during a human-computer interaction process, finding a way to control a cursor and to perform system functions by hand without wearing extra sensing apparatus and training processes is an important issue for the market.

BRIEF SUMMARY OF THE INVENTION

A method for a user using a trajectory of a single hand or trajectories of both hands to control actions of a mouse without touching a monitor is disclosed. The method obtains information of hand motions of the user by analyzing trajectories of a moving hand of the user. A two-stage action combination is utilized for the user to respectively control the movements of a cursor and perform system function.

According to one embodiment, a trajectory-based control method comprises obtaining at least one smoothed coordinate of an object in accordance with an object tracking procedure; performing a function control mode or a cursor control mode in accordance with a first trajectory of the object, wherein the first trajectory of the object is expressed in accordance with the at least one smoothed coordinate; performing at least one system function in accordance with the function control mode; and moving at least one cursor in accordance with the cursor control mode.

According to another exemplary embodiment, a trajectory-based control apparatus comprises a trajectory analyzing unit, a function controlling unit and a cursor controlling unit. The trajectory analyzing unit is utilized to express at least one trajectory of at least one object in accordance with at least one smoothed coordinate of the at least one object. The function controlling unit is utilized to perform at least one system function in accordance with the at least one trajectory of the at least one object. The cursor controlling unit is utilized to update a cursor location or a positioning cursor location in accordance with the at least one smoothed coordinate of the object.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the invention.

DETAILED DESCRIPTION OF THE INVENTION

Figure 1:
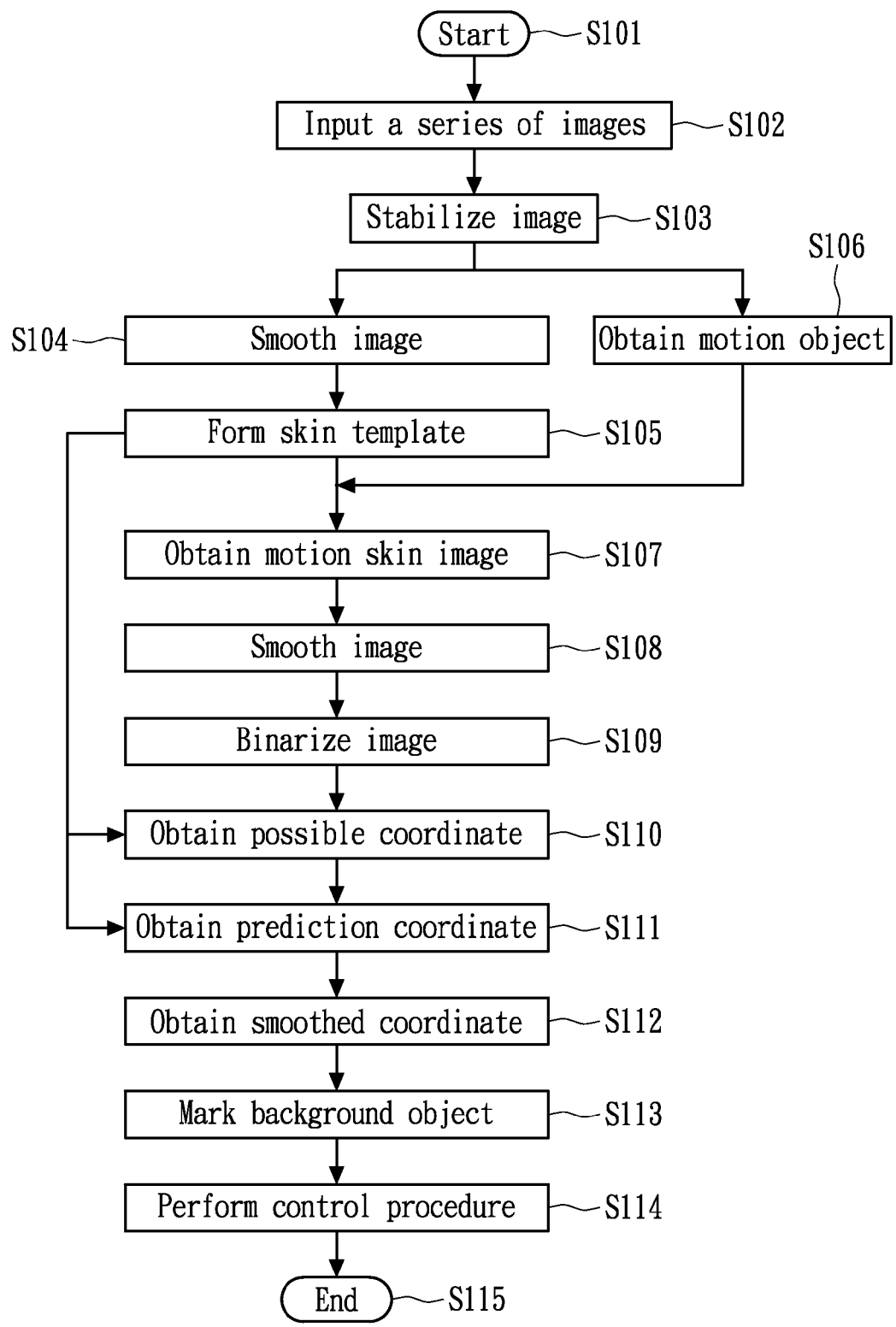
FIG. 1 shows a flowchart of a trajectory-based control method in accordance with an exemplary embodiment of the present disclosure.

FIG. 1 shows a flowchart of a trajectory-based control method in accordance with an exemplary embodiment of the present disclosure. In step S101, a trajectory-based controlling procedure is activated. In step S102, a series of images are being input. In step S103, environmental color shift and the aperture of an image capturing device are adjusted to stabilize the pixel coloring of the series of images. In step S104, a color space transformed image of each input image is obtained by transforming the color space of each input image to a YCbCr color space. A smoothed color space transformed image of each input image is subsequently obtained by smoothing the color space transformed image. In step S105, a skin template is formed by obtaining a skin feature image in accordance with the smoothed color space transformed image which was obtained most recently. In step S106, a motion feature image is obtained in accordance with the grayscale image of the input image obtained most recently and the grayscale image of the input image obtained second-most recently. In step S107, a motion skin image is obtained in accordance with the skin feature image and the motion feature image. In step S108, a smoothed motion skin image is obtained by smoothing the motion skin image. In step S109, a binarized motion skin image is obtained by binarizing the smoothed motion skin image. In step S110, a possible coordinate of an object is obtained in accordance with the binarized motion skin image. In accordance with an exemplary embodiment of the present disclosure, the object is a palm of a user.

In accordance with an exemplary embodiment of the present disclosure, the possible coordinate can be obtained in accordance with the equation (1)

$$\vec{T}_m' = \underset{\vec{P}_s^i}{\operatorname{argmin}}(d_i = \|\vec{P}_s^i - \vec{M}'\|_2 \mid i \in K), \quad (1)$$

where $\vec{T}_m'$ is the coordinate (i.e., the possible coordinate) of a skin area which is moving, K is a quantity of skin area(s) in the binarized motion skin image, $\vec{P}_s^i$ is a barycentric coordinate of i-th skin area in the skin feature image, $\vec{M}'$ is a kinematic-center coordinate obtained in accordance with the binarized motion skin image, $d_i$ is a norm of ($\vec{P}_s^i - \vec{M}'$). In accordance with an exemplary embodiment of the present disclosure, the above-mentioned $\vec{M}'$ can be obtained in accordance with the equation (2).

$$\vec{M}' = \underset{\vec{P}_m^i}{\operatorname{argmin}}(d_i = \|\vec{P}_m^i - \vec{M}\|_2 \mid i \in C), \quad (2)$$

where C is a quantity of motion area(s) in the motion feature image obtained most recently, $\vec{P}_m^i$ is a barycentric coordinate of i-th motion area in the motion feature image obtained most recently, $\vec{M}$ is a kinematic-center coordinate obtained in accordance with the motion feature image obtained second-most recently.

In step S111, a prediction coordinate of the palm is obtained in accordance with the binarized motion skin image obtained most recently. In accordance with an exemplary embodiment of the present disclosure, the prediction coordinate can be obtained in accordance with the equation (3).

$$\vec{T}_s' = \underset{\vec{P}_s^i}{\operatorname{argmin}}(d_i = \|\vec{P}_s^i - \vec{T}_s\|_2 \mid i \in K), \quad (3)$$

where $\vec{T}_s$ is a locked coordinate of a object area in the binarized motion skin image obtained second-most recently, $\vec{P}_s^i$ a barycentric coordinate of i-th skin area in the skin feature image, $\vec{T}_s'$ is a barycentric coordinate (i.e., the prediction coordinate) of a skin area which is close to the object area.

In step S112, a latest coordinate is obtained in accordance with the possible coordinate, the prediction coordinate and the object area in the binarized motion skin image obtained second-most recently. In accordance with an exemplary embodiment of the present disclosure, the equation (4) can be used as a criterion for obtaining the latest coordinate.

$$f = \frac{\|\vec{T}_s' - \vec{T}_m'\|_2}{\sqrt{A}}, \quad (4)$$

where $\sqrt{A}$ is the object area in the binarized motion skin image obtained second-most recently. When $\vec{T}_s' \ne \vec{T}_m'$ and f is less than a threshold value specified by a user, the $\vec{T}_m'$ is determined to be the latest coordinate. Alternatively, when $\vec{T}_s' \ne \vec{T}_m'$ and f is greater than the threshold value, the $\vec{T}_s'$ is determined to be the latest coordinate. Finally, in step S112, a smoothed coordinated of the palm is obtained in accordance with the latest coordinate, the locked coordinate and a weighting ratio.

In step S113, a coordinate(s) of non-object(s) (e.g., a face) is marked in accordance with the smoothed coordinate of the object. The coordinate of the non-object can be used as a reference for a next coordinate determination. A plurality of smoothed coordinates of the palm is obtained while images are being input over time. Trajectories of the palm can be expressed by the plurality of smoothed coordinates. Therefore, in step S114, a function control mode or a cursor control mode is performed in accordance with a trajectory of the palm. In accordance with an exemplary embodiment of the present disclosure, if the trajectory is a first designated trajectory (e.g., rotating clockwise/counterclockwise) or if the trajectory is unchanged (e.g., the palm stops moving) within a designated duration (e.g., one second), the function control mode is performed. In step S114, the trajectory-based controlling procedure is ended.

The following embodiment explains how to analyze a trajectory of an object by using smoothed coordinates. From the above, these smoothed coordinates can be seen as feature points of the trajectory of a motion palm. A feature-point connection-relationship table and a feature-point location-relationship table are obtained in accordance with the feature points. Connection relationships between any two feature points are recorded in the feature-point connection-relationship table. Relative location relationships between any two feature points are recorded in the feature-point location-relationship table according to multiple directions. The feature-point connection-relationship table and the feature-point location-relationship table are respectively compared with connection-relationship tables to be selected and location-relationship tables to be selected of patterns to be selected to identify the pattern to which the trajectory corresponds. Subsequently, a corresponding control procedure is performed in accordance with the above comparison result. In accordance with an exemplary embodiment of the present disclosure, a method for identifying a clockwise/counterclockwise trajectory is presented. A vector set $V=\{\vec{V}_1, \vec{V}_2, \ldots, \vec{V}_{n-2}, \vec{V}_{n-1}\}$ is obtained in accordance with a plurality of feature points $T=\{t_1(x_1, y_1), t_2(x_2, y_2), \ldots, t_{n-1}(x_{n-1}, y_{n-1}), t_n(x_n, y_n)\}$. An included angle $\theta_i$ between two vectors and an orthogonal vector $\vec{N}_i=(x_i,y_i,z_i)$ are obtained by calculating the cross product of each two neighbor vectors. Accordingly, whether a trajectory is a clockwise trajectory or a counterclockwise trajectory is determined in accordance with a positive value or a negative value of the included angle. In addition, turns of rotation can be determined in accordance with an accumulation angle of included angles.

Figure 2:
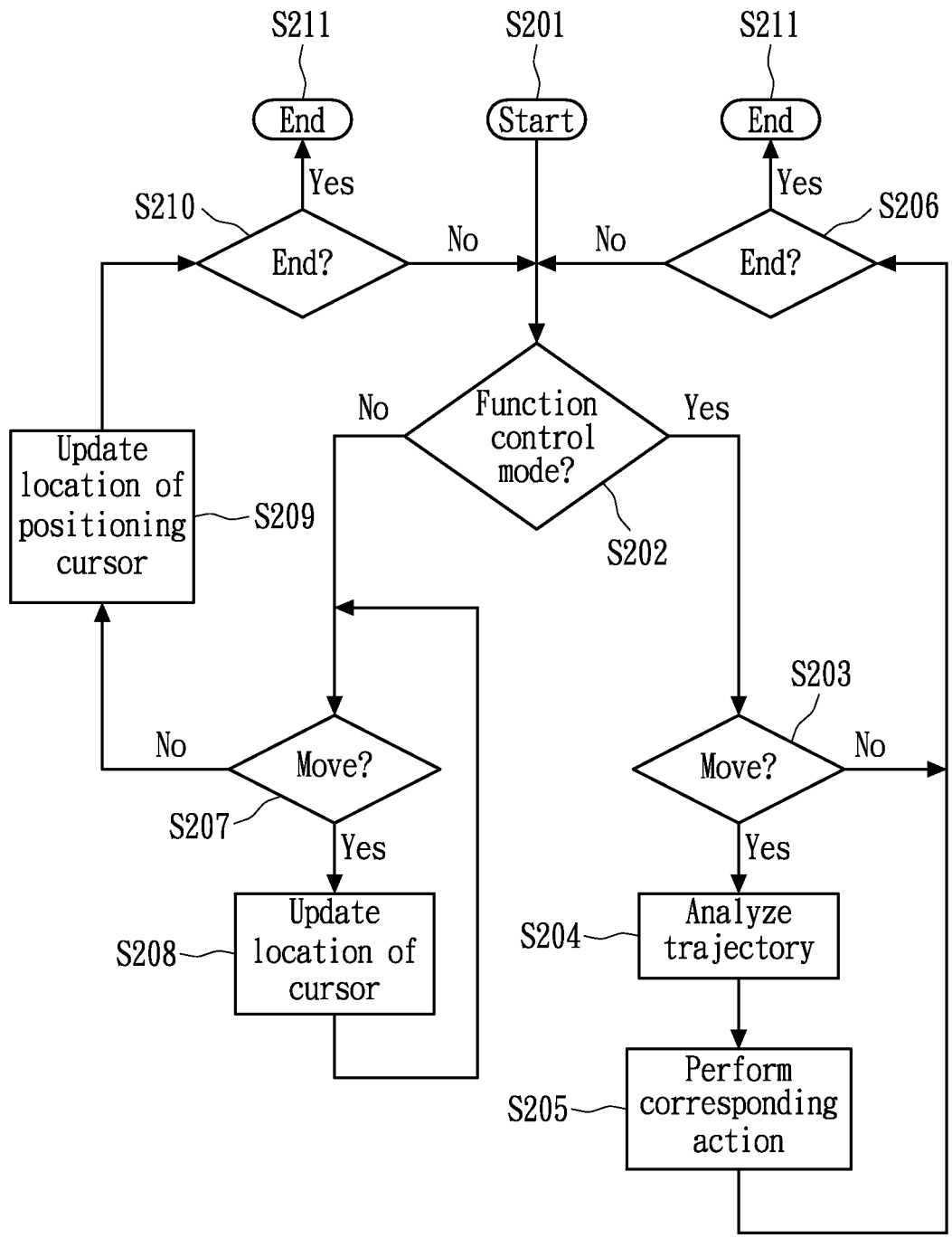
FIG. 2 shows a schematic view of details of step S114 in FIG. 1.

In accordance with an exemplary embodiment of the present disclosure, FIG. 2 shows details of step S114. Step S202 determines whether a function control mode is performed in accordance with a trajectory of the palm. The trajectory of the palm can be a two-dimensional trajectory or a three-dimensional trajectory. In accordance with an exemplary embodiment of the present disclosure, if the trajectory is unchanged (e.g., the palm stops moving) within a designated duration (e.g., one second), the function control mode is performed. After entering the function control mode, in step S203, whether the palm moves within a designated duration (e.g., 1.5 seconds) is checked again. If YES, a trajectory of the palm is analyzed in step S204. A semantic interpretation is obtained in accordance with the trajectory of the palm. For example, the trajectory of the palm can be a clockwise/counterclockwise trajectory, a 八 shape trajectory, a triangle shape trajectory or a right-left/up-down motion trajectory, which are represented for different semantic interpretations. This disclosure is not limited to semantic interpretations generated by a single palm. The semantic interpretations can also be generated by both palms. In step S205, a corresponding action is performed in accordance with an obtained semantic interpretation. For example, the corresponding action can be represented for left/middle/right button of a mouse, roll wheel of a mouse, page up/down, play, stop, different application programs (e.g., virtual keyboard on the screen), combination key configurations, play/selection/stop/fast forward/slow forward/full screen of a multimedia program or page up/page down/selection/mark for Microsoft PowerPoint.

Step S206 determines whether the function control mode is ended. In step S211, the function control mode is ended. In step S202, if a cursor control mode is determined in accordance with a trajectory of the palm, whether the palm stops moving is checked in step S207. If YES, a location of a cursor is moved in step S208. If NO, a location of a positioning cursor is moved in step S209. Step S210 determines whether the cursor control mode is ended. In step S211, the cursor control mode is ended. The above-mentioned latest coordinate, the possible coordinate, the locked coordinate, the prediction coordinate or the smoothed coordinate can be a kinematic-center coordinate or a barycentric coordinate.

Figure 3:
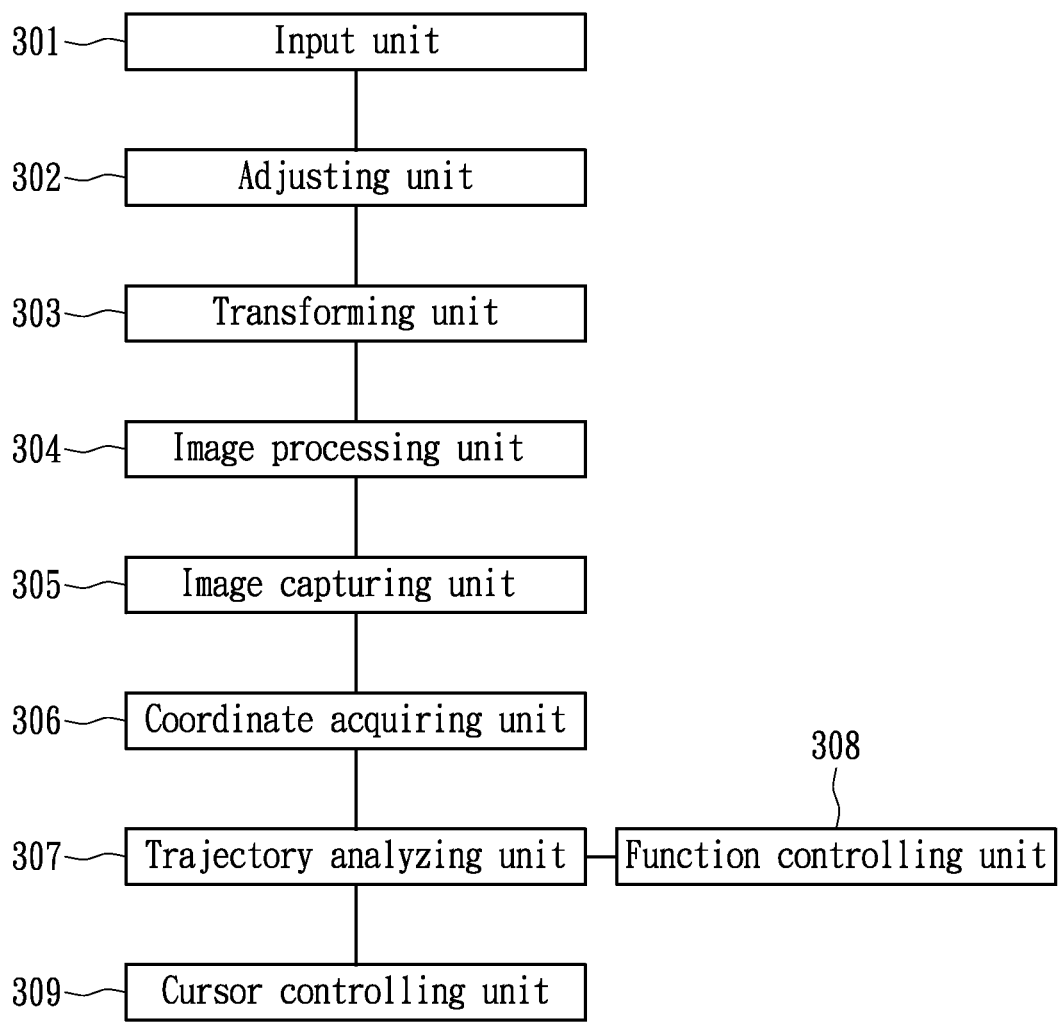
FIG. 3 shows a diagram of a trajectory-based control apparatus in accordance with another exemplary embodiment.

FIG. 3 shows a diagram of a trajectory-based control apparatus 300 in accordance with another exemplary embodiment. The trajectory-based control apparatus 300 comprises an input unit 301, an adjusting unit 302, a transforming unit 303, an image processing unit 304, an image capturing unit 305, a coordinate acquiring unit 306, a trajectory analyzing unit 307, a function controlling unit 308, and a cursor controlling unit 309. The trajectory analyzing unit 307 is utilized to express at least one trajectory of at least one object in accordance with at least one smoothed coordinate of the at least one object. The at least one object is a palm of a user. The at least one trajectory is a two-dimensional trajectory or a three-dimensional trajectory. The function controlling unit 308 is utilized to perform at least one system function in accordance with the at least one trajectory of the at least one object. The cursor controlling unit 309 is utilized to update a cursor location or a positioning cursor location in accordance with the at least one smoothed coordinate of the object.

The functions of the image processing unit 304 are as follows: obtaining at least one smoothed motion skin image by smoothing at least one motion skin image: obtaining at least one smoothed color space transformed image by smoothing at least one color space transformed image; obtaining at least one binarized motion skin image by binarizing the at least one smoothed motion skin image. The image capturing unit 305 is utilized to obtain at least one skin feature image, at least one motion feature image, the at least one motion skin image and the at least one binarized motion skin image in accordance with the at least one smoothed color space transformed image.

The functions of the coordinate acquiring unit 306 are as follows: obtaining at least one possible coordinate in accordance with the at least one binarized motion skin image and the at least one skin feature image; obtaining at least one prediction coordinate in accordance with at least one locked coordinate of the at least one object and the at least one skin feature image; obtaining at least one latest coordinate of the at least one object in accordance with the at least one possible coordinate, the at least one prediction coordinate and the area of the at least one object; obtaining the at least one smoothed coordinate of the at least one object in accordance with the at least one latest coordinate, the at least one locked coordinate and at least one weighting ratio; and marking the coordinate of at least one non-object.

The input unit 301 is utilized to input at least one image. The transforming unit 303 is utilized to transform the color space of the at least one image to a YCbCr color space and obtain at least one color space transformed image. The adjusting unit 302 is utilized to adjust environmental light source in accordance with the at least one image. The above-mentioned at least one smoothed coordinate, the at least one possible coordinate, the at least one locked coordinate, the at least one prediction coordinate or the at least one latest coordinate of the at least one object is a kinematic-center coordinate or a barycentric coordinate.

The above-described exemplary embodiments are intended only to illustrate the invention principle. Those skilled in the art may devise numerous alternative embodiments without departing from the scope of the following claims.

We claim:

1. A trajectory-based control method comprising: obtaining at least one smoothed coordinate of an object in accordance with an object tracking procedure, wherein the object tracking procedure utilizes a binarized motion skin image and a skin feature image to obtain the at least one smoothed coordinate of the object, wherein the object tracking procedure comprises the steps of: obtaining a possible coordinate of the object in accordance with the binarized motion skin image and the skin feature image; obtaining a prediction coordinate of the object in accordance with the skin feature image and a locked coordinate of the object; obtaining a latest coordinate of the object in accordance with the possible coordinate, the prediction coordinate and an area of the object; obtaining the at least one smoothed coordinate of the object in accordance with the latest coordinate, the locked coordinate and a weighting ratio; and marking the coordinate of at least one non-object in accordance with the at least one smoothed coordinate of the object; performing a function control mode or a cursor control mode in accordance with a first trajectory of the object, wherein the first trajectory of the object is expressed in accordance with the at least one smoothed coordinate; performing at least one system function in accordance with the function control mode; and moving at least one cursor in accordance with the cursor control mode.

2. The method of claim 1, wherein the function control mode is performed if the first trajectory is a first designated trajectory.

3. The method of claim 1, wherein the function control mode is performed if the first trajectory is unchanged within a first duration.

4. The method of claim 1, wherein the first trajectory is a two-dimensional trajectory or a three-dimensional trajectory.

5. The method of claim 1, wherein the object is a palm of a user.

6. The method of claim 1, wherein the object tracking procedure further comprises the steps of:
- obtaining a first smoothed color space transformed image;
- obtaining a second smoothed color space transformed image;
- obtaining the skin feature image in accordance with the second smoothed color space transformed image;
- obtaining a motion feature image in accordance with a grayscale image of the first smoothed color space transformed image and a grayscale image of the second smoothed color space transformed image;
- obtaining a motion skin image in accordance with the skin feature image and the motion feature image;
- obtaining a smoothed motion skin image by smoothing the motion skin image; and
- obtaining the binarized motion skin image by binarizing the smoothed motion skin image.

7. The method of claim 6, wherein the object tracking procedure further comprises the steps of:
- adjusting an environmental light source;
- inputting an image;
- transforming a color space of the image to a YCbCr color space and obtaining a color space transformed image; and
- obtaining the first smoothed color space transformed image or the second smoothed color space transformed image by smoothing the color space transformed image.

8. The method of claim 7, wherein the latest coordinate, the possible coordinate, the locked coordinate, the prediction coordinate or the at least one smoothed coordinate of the object is a kinematic-center coordinate or a barycentric coordinate.

9. The method of claim 1, wherein the function control mode comprises the steps of:
- analyzing a second trajectory of the object; and
- performing the at least one system function in accordance with the second trajectory.

10. The method of claim 9, wherein the function control mode is performed if the second trajectory is a second designated trajectory.

11. The method of claim 9, wherein the second trajectory is a two-dimensional trajectory or a three-dimensional trajectory.

12. The method of claim 1, wherein the cursor control mode comprises the steps of:
- updating a cursor location in accordance with the at least one smoothed coordinate of the object; and
- updating a positioning cursor location in accordance with the at least one smoothed coordinate of the object.

13. A trajectory-based control apparatus, comprising: a trajectory analyzing unit configured to express at least one trajectory of at least one object in accordance with at least one smoothed coordinate of the at least one object, wherein the trajectory analyzing unit comprises an image processing unit and an image capturing unit and a coordinate acquiring unit, the image processing unit is configured to obtain at least one smoothed motion skin image by smoothing at least one motion skin image and to obtain at least one smoothed color space transformed image by smoothing at least one color space transformed image and to obtain at least one binarized motion skin image by binarizing the at least one smoothed motion skin the image capturing unit configured to obtain at least one skin feature image and at least one motion feature image and the at least one motion skin image and the at least one binarized motion skin image in accordance with the at least one smoothed color space transformed image; and the coordinate acquiring unit configured to obtain at least one possible coordinate in accordance with the at least one binarized motion skin image and the at least one skin feature image and to obtain at least one prediction coordinate in accordance with at least one locked coordinate of the at least one object and the at least one skin feature image and to obtain at least one latest coordinate of the at least one object in accordance with the at least one possible coordinate and the at least one prediction coordinate and an area of the at least one object and to obtain the at least one smoothed coordinate of the at least one object in accordance with the at least one latest coordinate and the at least one locked coordinate and at least one weighting ratio and to mark the coordinate of at least one coordinate non-object in accordance with the at least one smoothed coordinate of the at least one object; a function controlling unit configured to perform at least one system function in accordance with the at least one trajectory of the at least one object; and a cursor controlling unit configured to update a cursor location or a positioning cursor location in accordance with the at least one smoothed coordinate of the object.

14. The apparatus of claim 13, further comprising:
- an input unit configured to input at least one image;
- a transforming unit configured to transform the color space of the at least one image to a YCbCr color space and obtain at least one color space transformed image; and
- an adjusting unit configured to adjust environmental light source in accordance with the at least one image.

15. The apparatus of claim 13, wherein the at least one trajectory is a two-dimensional trajectory or a three-dimensional trajectory.

16. The apparatus of claim 13, wherein the at least one object is a palm of a user.

17. The apparatus of claim 13, wherein the at least one smoothed coordinate, the at least one possible coordinate, the at least one locked coordinate, the at least one prediction coordinate or the at least one latest coordinate of the at least one object is a kinematic-center coordinate or a barycentric coordinate.

* * * * *